United States Patent
Zhao et al.

(10) Patent No.: US 9,411,733 B2
(45) Date of Patent: Aug. 9, 2016

(54) SHARING PATTERN-BASED DIRECTORY COHERENCE FOR MULTICORE SCALABILITY ("SPACE")

(75) Inventors: Hongzhou Zhao, Rochester, NY (US); Arrvindh Shriraman, Burnaby (CA); Sandhya Dwarkadas, Pittsford, NY (US)

(73) Assignee: University of Rochester, Rochester, NY (US)

(*) Notice: Subject to any disclaimer, the term of this patent is extended or adjusted under 35 U.S.C. 154(b) by 0 days.

(21) Appl. No.: 13/607,290

(22) Filed: Sep. 7, 2012

(65) Prior Publication Data

US 2014/0032848 A1    Jan. 30, 2014

Related U.S. Application Data

(60) Provisional application No. 61/532,860, filed on Sep. 9, 2011.

(51) Int. Cl.
| | | |
|---|---|---|
| *G06F 12/00* | (2006.01) | |
| *G06F 12/08* | (2016.01) | |

(52) U.S. Cl.
CPC ............ *G06F 12/084* (2013.01); *G06F 12/082* (2013.01); *G06F 12/0826* (2013.01); *G06F 2212/1044* (2013.01)

(58) Field of Classification Search
CPC ..... G06F 12/08; G06F 12/084; G06F 12/082; G06F 12/0826; G06F 2212/1044
See application file for complete search history.

(56) References Cited

U.S. PATENT DOCUMENTS

| | | | | |
|---|---|---|---|---|
| 6,633,958 | B1* | 10/2003 | Passint | G06F 12/0826 711/119 |
| 6,915,388 | B1* | 7/2005 | Huffman | G06F 12/0826 711/145 |
| 7,620,766 | B1* | 11/2009 | Waldspurger | G06F 12/1018 711/202 |
| 7,805,575 | B1* | 9/2010 | Agarwal | G06F 12/0811 711/141 |
| 8,271,735 | B2* | 9/2012 | Cypher | G06F 12/0817 711/130 |
| 2001/0010068 | A1* | 7/2001 | Michael | G06F 12/0817 711/119 |
| 2008/0059710 | A1* | 3/2008 | Handgen | G06F 12/082 711/128 |
| 2010/0005254 | A1* | 1/2010 | Cooke | G06K 9/6276 711/156 |
| 2011/0196874 | A1* | 8/2011 | Ittiachen | G06F 17/30699 707/747 |
| 2012/0246446 | A1* | 9/2012 | Solihin | G06F 9/30 712/205 |

OTHER PUBLICATIONS

Ca Acacio, M.E. et al., "A two-level directory architecture for highly scalable cc-NUMA multiprocessors" Jan. 2005 IEEE Trans. Parallel Distrib. Syst., vol. 16, No. 1 (pp. 67-79).*

(Continued)

*Primary Examiner* — David X Yi
*Assistant Examiner* — Tahilba Puche
(74) *Attorney, Agent, or Firm* — Harris Beach PLLC

(57) ABSTRACT

A method and directory system that recognizes and represents the subset of sharing patterns present in an application is provided. As used herein, the term sharing pattern refers to a group of processors accessing a single memory location in an application. The sharing pattern is decoupled from each cache line and held in a separate directory table. The sharing pattern of a cache block is the bit vector representing the processors that share the block. Multiple cache lines that have the same sharing pattern point to a common entry in the directory table. In addition, when the table capacity is exceeded, patterns that are similar to each other are dynamically collated into a single entry.

11 Claims, 14 Drawing Sheets

(56) References Cited

OTHER PUBLICATIONS

Agarwal, A. et al., "An evaluation of directory schemes for cache coherence," in ISCA 1988: CB Proceedings of the 15th Annual International Symposium on Computer architecture, pp. 280-289.*
Acacio, M.E. et al., "A two-level directory architecture for highly scalable cc-NUMA multiprocessors," 2005 IEEE Trans. Parallel Distrib. Syst., vol. 16, No. 1 (pp. 67-69).
Agarwal, A. et al., "An evaluation of directory schemes for cache coherence," in ISCA '88: Proceedings of the 15th Annual International Symposium on Computer architecture, 1988 (pp. 280-289).
Ahmed, A. et al., "AMD Opteron shared memory mp systems," 2002 in Proceedings of the 14th HotChips Symposium.
Alameldeen, A.R. et al., "Simulating a $2m commercial server on a $2k pc," Computer 2003, vol. 36, No. 2 (pp. 50-57).
Buehrer, G. et al., "Adaptive parallel graph mining for CMP architectures," 2006 in Proceedings of the Sixth International Conference on Data Mining (pp. 97-106).
Censier, L.M. et al., "A new solution to coherence problems in multicache systems," Dec. 1978 IEEE Transactions on Computers, vol. C-27, No. 2 (pp. 1112-1118).
Chaiken, D. et al., "LimitLESS directories: A scalable cache coherence scheme," Apr. 1991 in Proceedings of the 4th Symposium on Architectural Support for Programming Languages and Operating Systems (pp. 224-234).
Choi, J.H. et al., "Segment directory enhancing the limited directory cache coherence schemes," 1999 in Proc. 13th International Parallel and Distributed Processing Symp. (pp. 258-267).
Gupta, A. et al., "Reducing memory and traffic requirements for scalable directory-based cache coherence schemes," 1990 in International Conference on Parallel Processing (pp. 312-321).

Intel Corporation, "Intel Core Duo Processor and Intel Core Solo Porcessor on 65 nm Process," Jan. 2007 http://download.intel.com/design/mobile/datashts/30922106.pdf.
Laudon, J. et al., "The SGI origin: a ccNUMA highly scalable server," 1997 SIGARCH Comput. Archit. News, vol. 25, No. 2 (pp. 241-251).
Magnusson, P.S.et al., "Simics: A full system simulation platform," 2002 Computer, vol. 35, No. 2 (pp. 50-58).
Martin M.M.K. et al., "Multifacet's general execution-driven multiprocessor simulator (GEMS) toolset," 2005 SIGARCH Comput. Archit. News, vol. 33, No. 4 (pp. 92-99).
Muralimanohar, N. et al., "Optimizing NUCA organizations and wiring alternatives for large caches with CACTI 6.0," 2007 in Proceedings of the 40th International Symposium on Microarchitecture (pp. 3-14).
O'Krafka, B.W. et al., "An empirical evaluation of two memory-efficient directory methods," 1990 in ISCA '90: Proceedings of the 17th annual international symposium on Computer Architecture (pp. 138-147).
Simoni, Jr., R.T., "Cache coherence directories for scalable multiprocessors," 1992 PhD thesis, Technical Report: CSL-TR-92-550, Stanford University, Stanford, CA, USA.
Sun Microsystems, Inc., "Opensparc T2 system-on-chip (SoC) microarchitecture specification," May 2008 http://www.opensparc.net/opensparc-t2/index.html.
Woo, S.C. et al., "The SPLASH-2 Programs: Characterization and Methodological Considerations," Jun. 1995 in Proceedings of the 22nd Annual International Symposium on Computer Architecture.
Zebchuk, J. et al., "A tagless coherence directory," 2009 in MICRO 42: Proceedings of the 42nd Annual IEEE/ACM International Symposium on Microarchitecture (pp. 423-434).
Zilles, C., "Brief Announcement: Transactional memory and the birthday paradox," 2007 in 19th ACM Symposium on Parallelism in Algorithms and Architectures.

\* cited by examiner

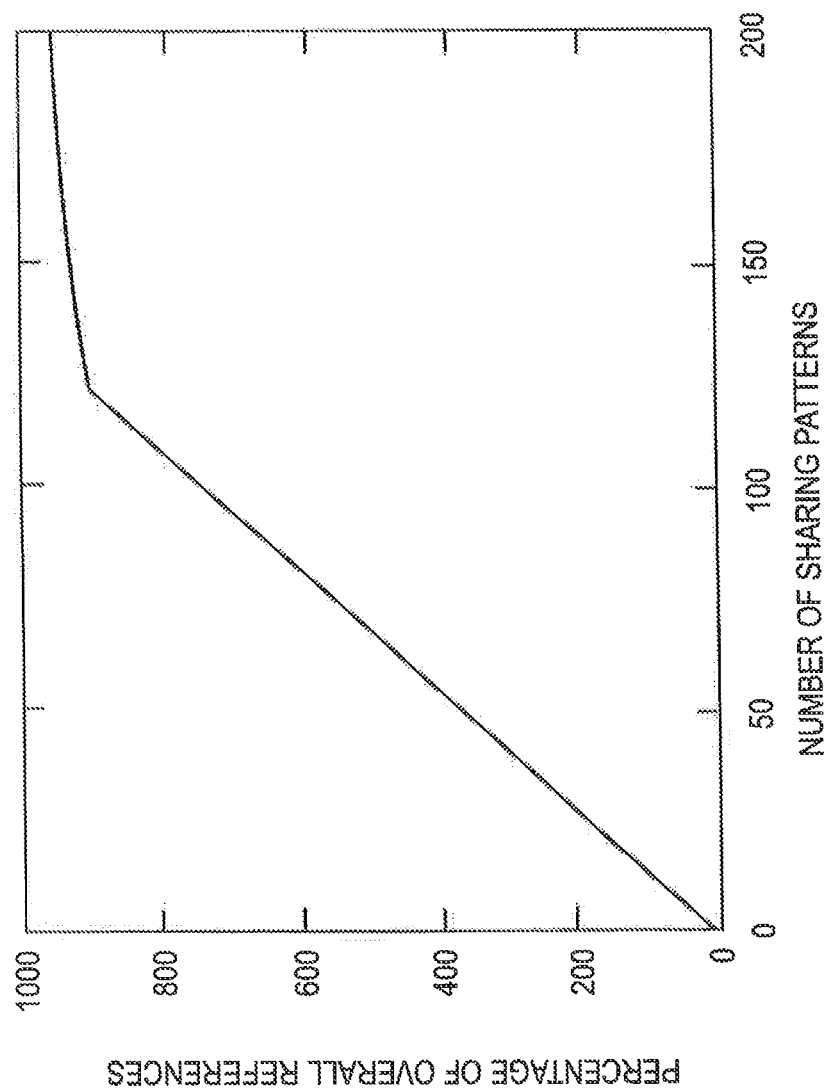

SHARING PATTERN-BASED DIRECTORY COHERENCE FOR MULTICORE SCALABILITY ("SPACE")

CROSS-REFERENCE TO RELATED APPLICATIONS

This application claims the benefit of U.S. provisional application No. 61/532,860, filed Sep. 9, 2011, which is hereby incorporated by reference in its entirety.

FIELD OF THE INVENTION

The present invention relates to a system and method for recognizing and representing the subset of sharing patterns present in an application. More specifically, the present invention relates to a method and system for storing a single copy of sharing patterns present in an application at any given time, organized in a set-associative manner, and decoupled from each cache line.

BACKGROUND OF THE INVENTION

Multicore processors continue to provide a hardware coherent memory space to facilitate effective sharing across cores. As the number of cores on a chip increases with improvements in technology, implementing coherence in a scalable manner remains an increasing challenge. Snoopy and broadcast protocols forward coherence messages to all processors in the system and are bandwidth intensive. They also have inherent limitations in both performance and energy and it is unlikely that they will be able to effectively scale to large core counts.

Directory-based protocols are able to support more scalable coherence by associating information about sharer cores with every cache line. However, as the number of cores and cache sizes increase, the directory itself adds significant area and energy overheads.

The conceptually simple approach is to adapt a full map sharer directory and associate a P-bit vector with every cache line, where P is the number of processors. Unfortunately, this makes the directory size dependent on the number of shared cache lines (M) and the number of processors, resulting in a directory size that is $O(M*P)$.

FIG. 1 depicts a prior art baseline tiled multicore architecture and L2 Full Map: sharer vectors associated with cache line. As shown in FIG. 1, each tile in the multicore consists of a processor core, private L1 (both I and D) cache, and a bank of the globally-shared last-level L2 cache. Coherence at the L1 level is maintained using an invalidation-based directory protocol and directory entries are maintained at the home L2 bank of a cache line.

Full bit map directories are an attractive approach that was first proposed for multiprocessors but can be extended to maintain coherence in multicores with an inclusive shared cache. The sharing cores are represented as a bit-vector associated with each cache block, with each bit representing whether the corresponding core has a copy of the block. Sharer information is accessed in parallel with the data.

The Shadow tag approach, which is used in many current processors, require a highly associative and energy intensive lookup operation. While tagless lookup was recently proposed to optimize the shadow tag approach by compressing the replicated L1 cache tags, it uses a set of bloom filters to concisely summarize tags in each cache set. The energy intensive associative lookup needed by shadow tags is thus replaced with bloom filter tests.

Various other approaches have been proposed to reduce the area overheads of a full bit map directory, including the use of a directory cache, a compressed sharer vector, and pointer. Directory caches restrict the blocks for which precise sharing information can be maintained simultaneously. Compressed sharer vectors fix the level of imprecision at design time-all cache lines suffer from imprecision. Pointers incur significant penalty, for example, due to the need to revert to either software or broadcast mode, when the number of sharers exceeds the number of pointers.

What is needed is a method and system, such as a directory table, that takes advantage of the observation that many memory locations in an application are accessed by the same set of processors, resulting in a few sharing patterns that occur frequently and represents the subset of sharing patterns recognized. What is also needed is a method and system that decouples (e.g., does not require a one-to-one correspondence between directory entries and cache lines) the sharing pattern from each cache line and holds them in a separate directory table. What is also needed is for multiple cache lines that have the same sharing pattern to point to a common entry in the directory table. For example, with the directory table storing the sharing patterns, each cache line includes a pointer whose size is proportional to the number of entries in the directory.

SUMMARY OF THE INVENTION

The present invention is a method and directory system that recognizes and represents the subset of sharing patterns present in an application. As used herein, the term sharing pattern refers to a group of processors accessing a single memory location in an application. The present invention (hereinafter referred to as "SPACE") decouples the sharing pattern from each cache line and holds them in a separate directory table. SPACE takes advantage of the observation that many memory locations in an application are accessed by the same set of processors, resulting in a few sharing patterns that occur frequently. The sharing pattern of a cache block is the bit vector representing the processors that share the block. Multiple cache lines that have the same sharing pattern point to a common entry in the directory table. In addition, when the table capacity is exceeded, patterns that are similar to each other are dynamically collated into a single entry.

The directory area overhead of SPACE is thus $O(M*\log 2K)$, where K is the logical number of entries in the directory table, assuming that M is significantly larger than P so that this factor dominates the area of the directory table itself (which is $O(K*P)$). SPACE simplifies the design by using a constant number of entries in the directory table (fixed at design time). SPACE accommodates new sharing patterns when the directory table capacity is exceeded, unlike directory caches that default to broadcast for these cases, by dynamically collating patterns that are similar to each other into a single sharer pattern.

Dynamically collating similar patterns achieves significant reduction in false sharers (almost completely eliminates it). A directory table having a size, for example of 256 entries for a 16 core chip, or 512 entries for a 32 core chip, can handle the access patterns in many applications. Typically, the number of directory table entries is $O(P)$. Hence, the area required for the pointers per cache line is $O(\log 2P)$, which results in increasing savings with SPACE with increasing number of processors. For example, SPACE occupies 44% the area of a prior art full map directory at 16 processors, and 25% at 32 processors.

BRIEF DESCRIPTION OF THE DRAWINGS

FIG. 4A shows the number of patterns that get frequently referenced by an Apache application.

DETAILED DESCRIPTION

Sharing Patterns

In this application, we describe SPACE, a directory design based on recognizing and representing the subset of sharing patterns present in an application. SPACE takes advantage of the observation that many memory locations in an application are accessed by the same set of processors, resulting in a few sharing patterns that occur frequently. The sharing pattern of a cache block is the bit vector representing the processors that share the block. SPACE decouples the sharing pattern from each cache block and holds them in a separate directory table. Multiple cache lines that have the same sharing pattern point to a common entry in the directory table. In addition, when the table capacity is exceeded, patterns that are similar to each other are dynamically collated into a single entry.

The sharing pattern of a location refers to the set of processors accessing it. We demonstrate that many applications possess sharing pattern locality, i.e., there are a few unique patterns that are referenced frequently and many cache lines have a common sharing pattern. A conventional directory hence essentially stores duplicate copies of the same sharing patterns. We exploit this observation and propose the SPACE approach, which leverages the sharing pattern commonality by completely decoupling the sharing patterns from the shared cache and storing only a pointer to the specific pattern with each cache line. This permits all cache lines that have the same sharing pattern to point to a common pattern entry. We find that with a small number of entries in the pattern table, we can effectively support a large fraction of the directory references from cache lines: e.g. 128-256 entries for a 16 processor multicore and 256-512 entries for a 32 processor multicore. We have shown that SPACE can perform within 2% of a conventional full map directory in spite of occupying only 44% at 16 processors and 25% at 32 processors of the full map's area.

The sharing pattern of a cache line can be represented as a P-bit vector (where P is the number of processors), with each bit specifying if the corresponding processor has a copy of the block. The maximum number of sharing patterns possible is $2^P$. A conventional prior art directory will assume that each cache line has a unique pattern and that this pattern could be any one of 2P. Hence, each cache line has an associated P-bit sharing pattern. Many cache lines in the application are accessed by the same set of processors, which essentially leads to the same sharing bit-vector pattern. Because of application semantics and the regular nature of inter-thread sharing, it is also likely for a system to repeatedly encounter the same set of patterns.

Figure 1:
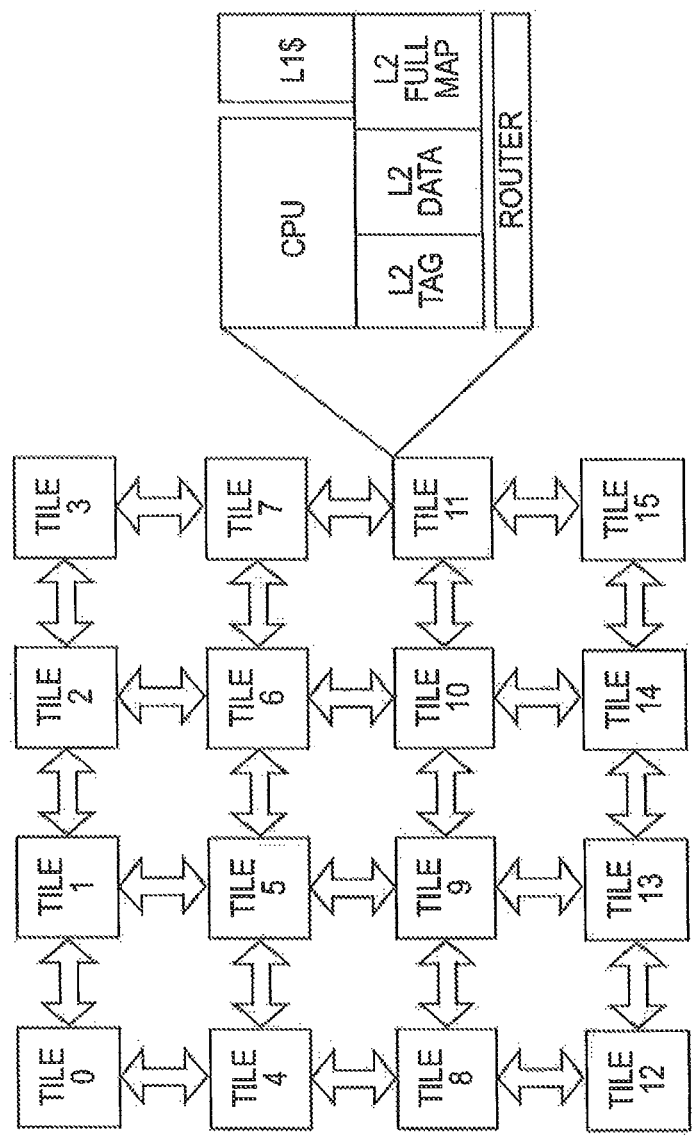
FIG. 1 depicts a prior art baseline tiled multicore architecture and L2 Full Map: sharer vectors associated with cache line.
Figure 2:
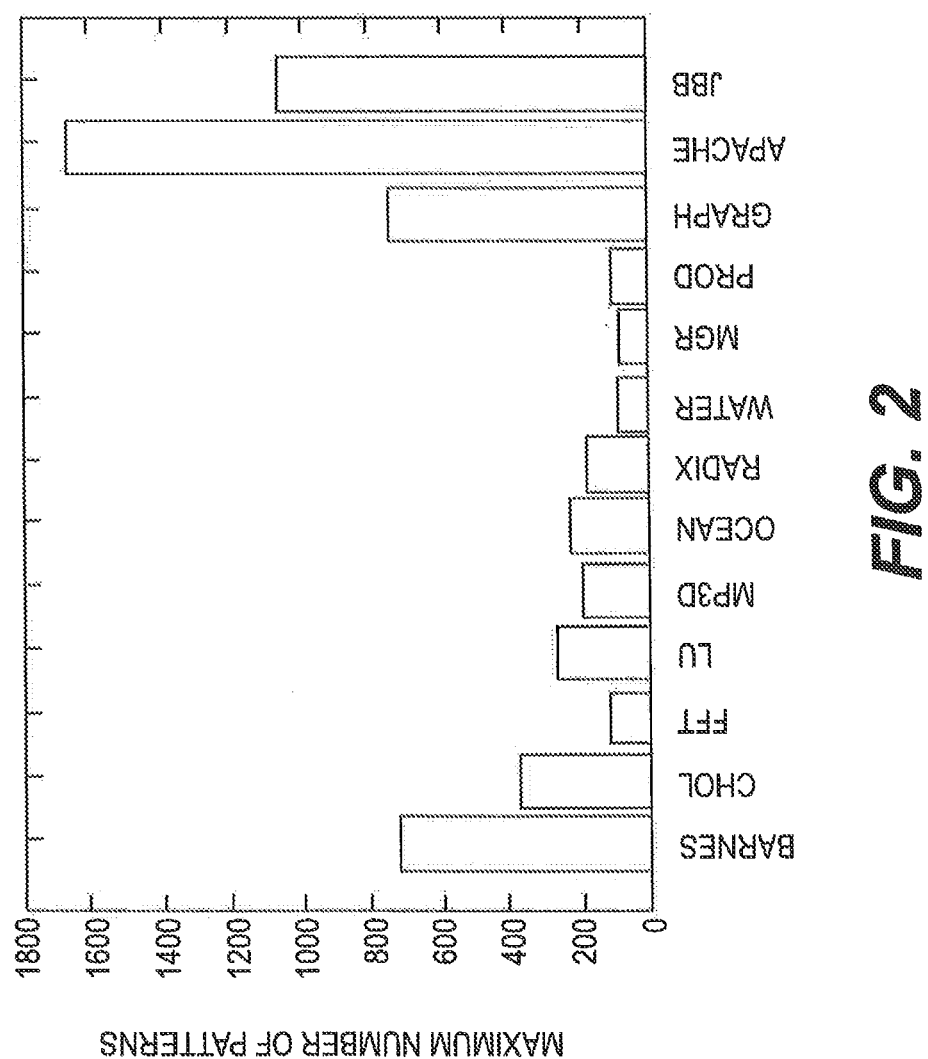
FIG. 2 depicts a maximum number of sharing patterns of application in any snapshot for a 16 processor system.

FIG. 2 shows the maximum number of patterns encountered in an application during any snapshot of its execution (examined every 100,000 instructions) for a 16 processor system. Although the maximum possible number of patterns is 65536 at 16 processors, the actual number of patterns observed in our application suite did not exceed 1800. The commercial workloads (Apache and SPECjbb) tend to have many different patterns, while scientific workloads (SPLASH2) have a limited number of sharing patterns with regular data accesses. This relatively small number of patterns present in the applications compared to the total number of possible patterns suggests an opportunity to design a directory according to the present invention that holds the sharing patterns that occur without assuming that each cache line demonstrates a unique pattern.

An important metric of interest to the present invention is the distribution of cache lines with the same sharing patterns. The existence of good sharing pattern locality (many cache lines display the same sharing pattern) increases the effectiveness of a directory based on common sharing patterns. In an embodiment of the present invention, a single entry can describe the sharing pattern of many cache lines.

Figure 3A:
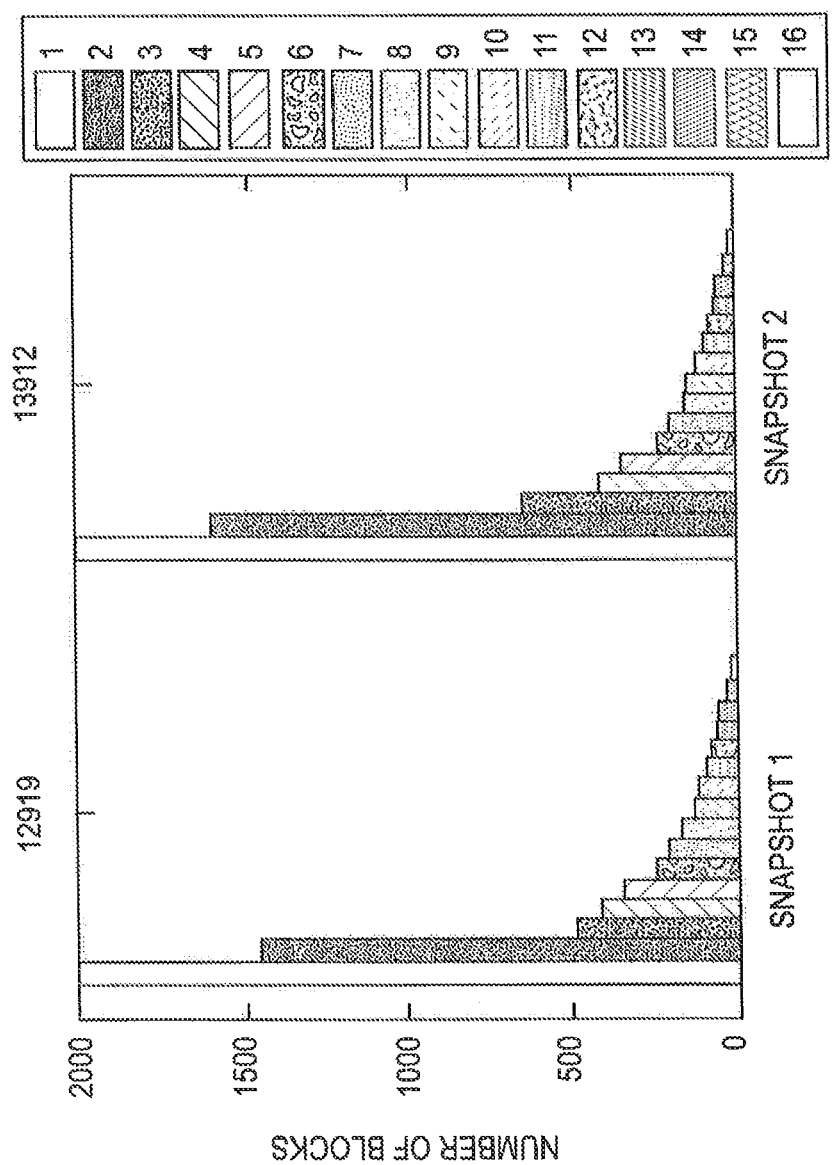
FIG. 3A shows the degree of sharing across two different snapshots for an Apache application.
Figure 3B:
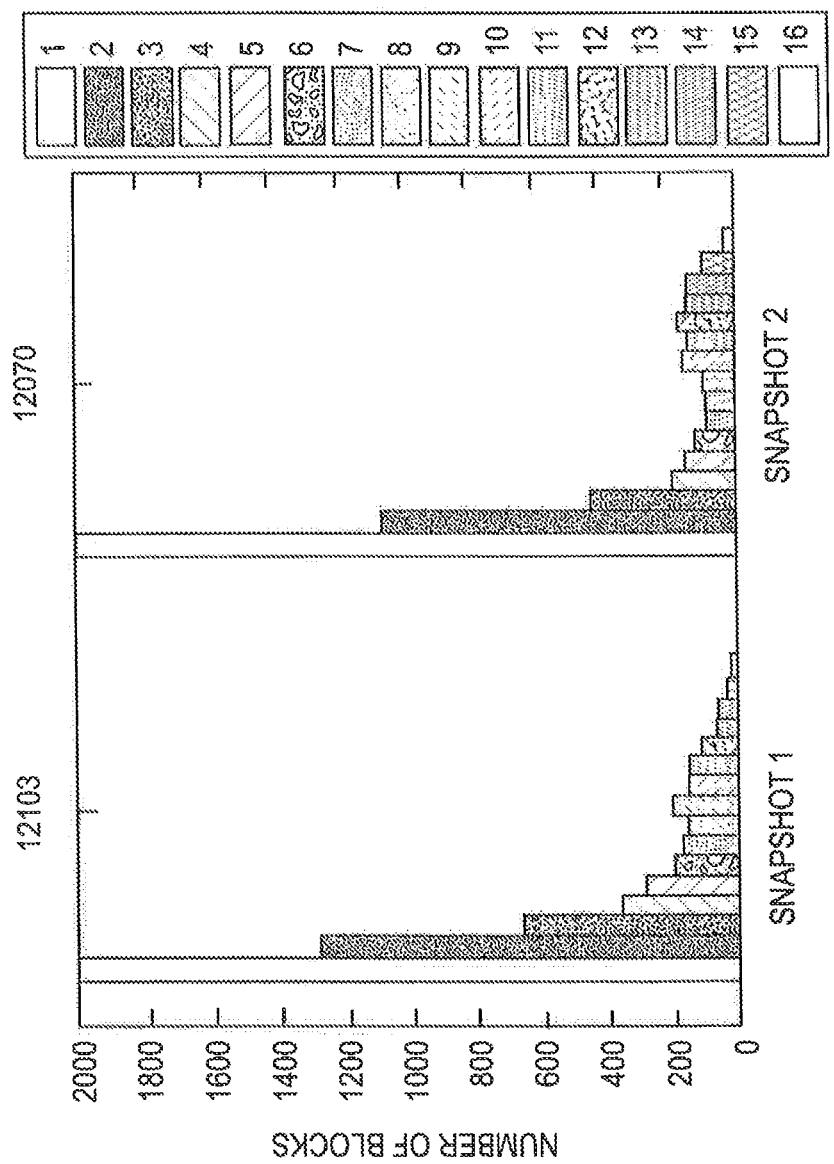
FIG. 3B shows the degree of sharing across two different snapshots for a Specjbb application.
Figure 3C:
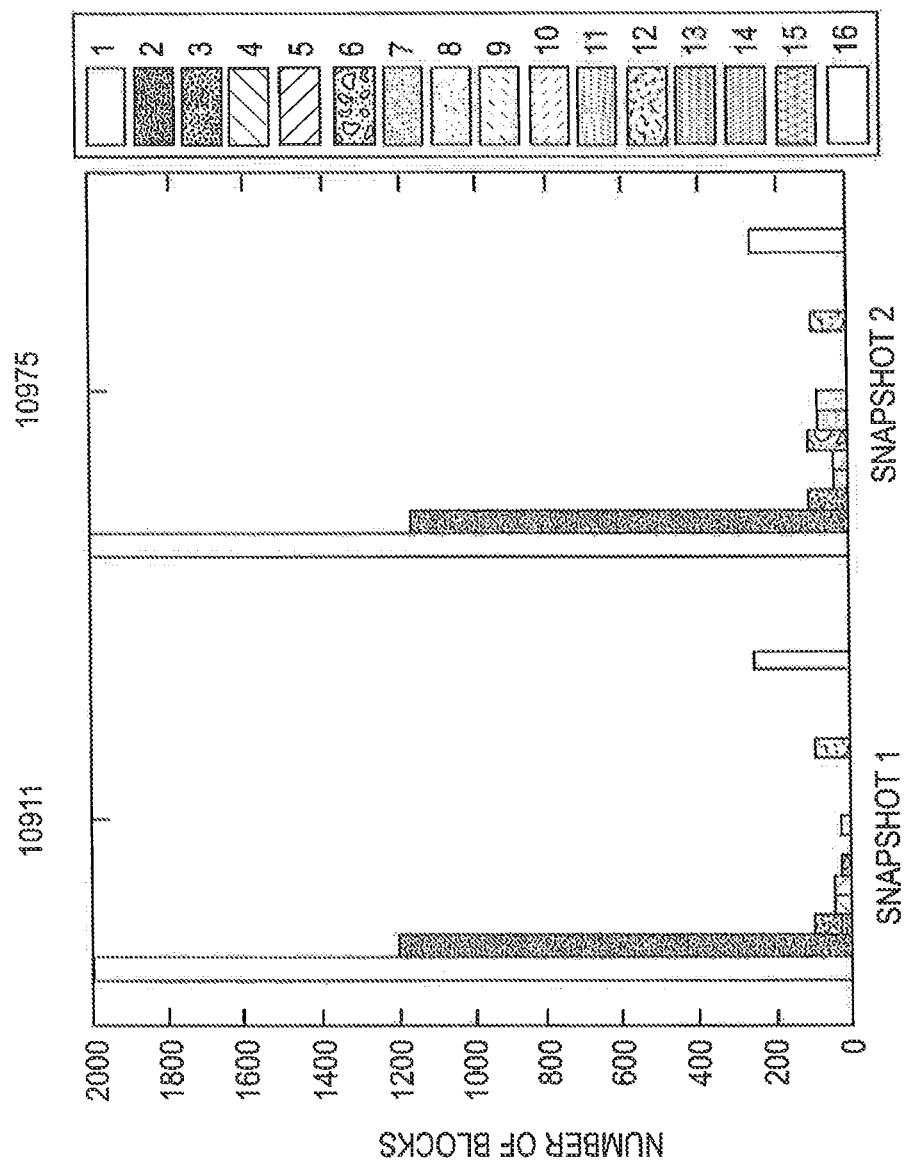
FIG. 3C shows the degree of sharing across two different snapshots for a Barnes application.

FIG. 3 shows the degree of sharing across two different snapshots of three different applications. Each bar in the histogram represents the number of cache lines with patterns with a certain number of processors sharing the cache line. Each cluster in the graph represents a snapshot of the sharing information of cached blocks. As shown, the snapshots were taken at regular intervals (1000 transactions for Apache and SPECjbb, 1 million instructions for SPLASH2) and observed to remain steady over time. FIG. 3 illustrates that private accesses are the dominant sharing pattern, exhibited by over 70% of the blocks in Apache and SPECjbb, and 90% of the blocks in Barnes (other SPLASH2 workloads demonstrate similar behavior). FIG. 3 also illustrates that the distribution of the blocks across the patterns remains relatively stable. This indicates that while a given cache line's sharing pattern may change, overall, the application accesses cache lines in a similar manner. Note that the histogram tails off sharply, indicating that the number of sharers per cache line is small on average.

In an embodiment of the present invention, a cache line is referred to on downgrades and invalidations. A downgrade includes when a copy is requested by a processor and an L1 has a modified version. An invalidation includes when a processor wants to modify the memory location and the sharer copies need to be invalidated. In addition, the sharing pattern is also updated when a copy of a read-shared line is requested.

Figure 4B:
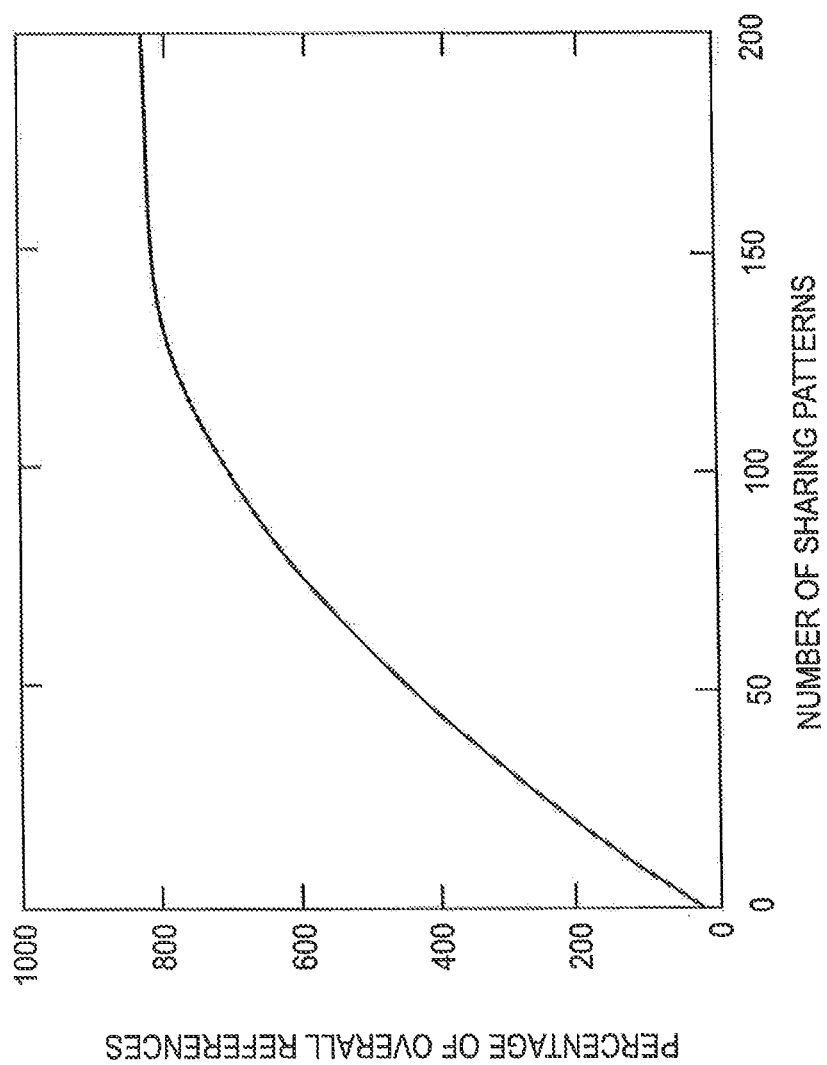
FIG. 4B shows the number of patterns that get frequently referenced by a Specjbb application.
Figure 4C:
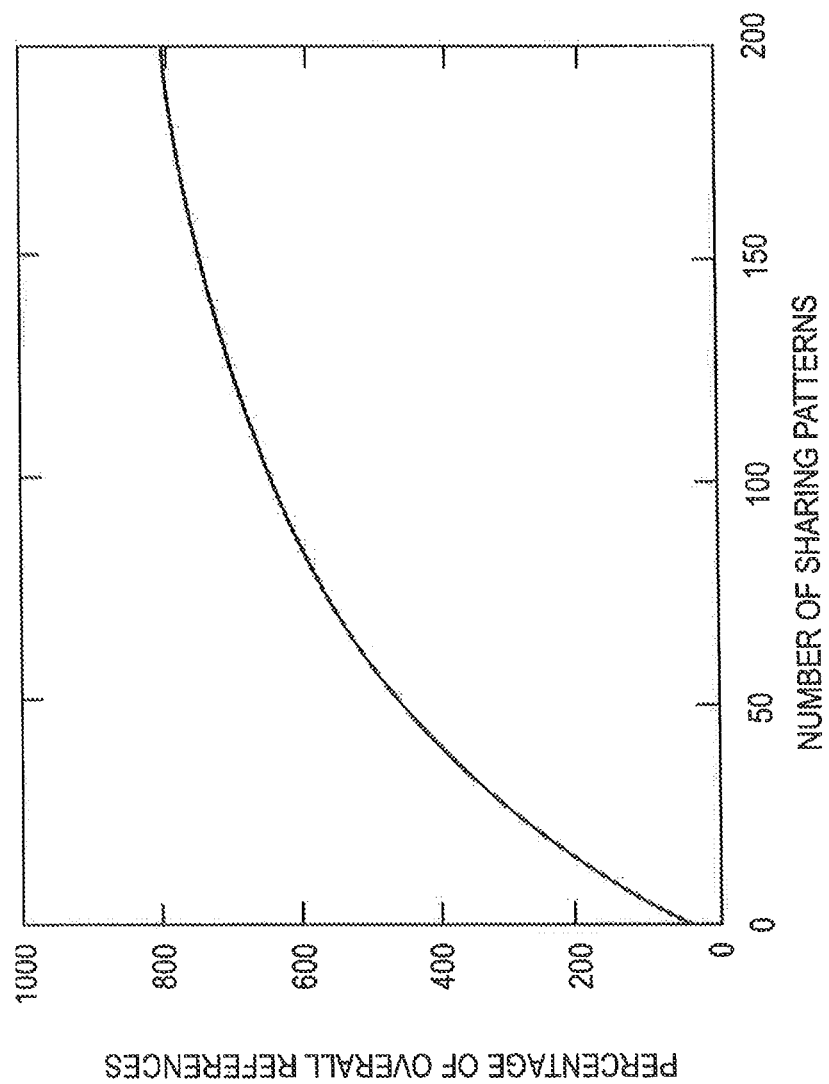
FIG. 4C shows the number of patterns that get frequently referenced by a Barnes application.

FIG. 4 shows the number of patterns that get frequently referenced. In all these applications, more than 80% of the total references go to the 200 most frequently accessed patterns. This indicates that imprecisely maintaining the sharers for many shared cache lines (e.g., read-only) will not hurt performance. According to FIG. 4, the linear curve segment in Apache indicates that the number of references is uniformly distributed across all of the frequently accessed patterns. In an embodiment of the present invention, many cache lines have a common sharing pattern and the number of the patterns that are frequently referenced is small. A directory that supports a few sharing patterns can be sufficiently accurate to save bandwidth. In an embodiment of the present invention, the number of patterns that a directory needs to support for a real application is 40× (Apache, SPECjbb)-800× (Water) less than the maximum number of sharing patterns. In an embodiment of the present invention, the number of patterns in the directory will remain stable during the execution. In an embodiment of the present invention, the total number of sharing patterns that a directory has to support for a given applications can be fixed. The variation between the applications with regards to the maximum number of sharing patterns is 75 (Water)-1700 (Apache) (see FIG. 2). In an embodiment of the present invention, a directory with fewer entries than the worst-case (1700) is provided. In an embodiment of the invention, the directory includes an effective way of dynamically managing patterns when there are no free entries.

The present invention decouples the sharing pattern from each cache line and holds them in a separate directory table. Multiple cache lines that have the same sharing pattern point to a common entry in the directory table. With the directory table storing the patterns, each cache line includes a pointer whose size is proportional to the number of entries in the directory. The directory table may be organized as a two-dimensional set-associative structure similar to traditional cache organizations in order to reduce conflicts, with $N_{Dir}$:ways ways (e.g., number of columns) and $N_{Dir}$:sets sets (e.g., number of rows) In an embodiment of the present invention, the size of the directory table is fixed based on the application characteristics and is implemented entirely on-chip. Hence, when the table capacity is exceeded, we have a dynamic mechanism to collate patterns that are similar to each other into a single entry.

Figure 5:
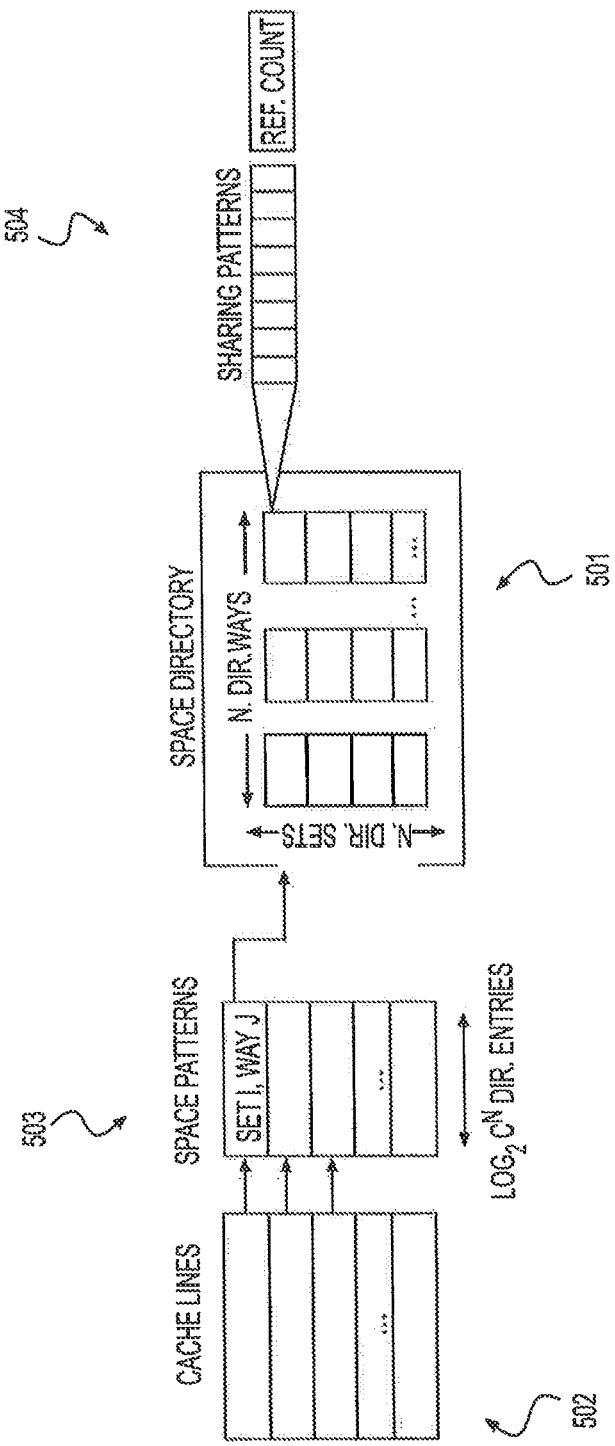
FIG. 5 depicts a system for decoupling the metadata representing sharing patterns from the address tags representing the data blocks, in a cache coherent shared memory computer, according to an embodiment of the present invention.

FIG. 5 depicts a system for storing sharing patterns that are organized in a set-associative manner and decoupled from each cache line according to an embodiment of the present invention. The FIG. 5 embodiment of the invention is implemented on a multicore with 16 processors, with 64 KB private L1 caches per core, and a 16 MB shared inclusive L2 cache. The prior art conventional full map directory design would include an entry for each cache line for a total of 262144 (16 MB/64 byte) entries. In the FIG. 5 embodiment of the invention, a directory table 501 is shown with $N_{Dir}$:entries ($N_{Dir}$:ways*$N_{Dir}$:sets) entries, each entry corresponding to a sharing pattern. The sharing pattern 504 is represented by a 16-bit vector. According to an embodiment of the present invention, for each cache line in the L2 cache, the sharing vector is replaced with a log 2($N_{Dir}$:entries) bit pointer 503 to indicate the sharing pattern. When the sharer information is needed, the data block tag is first accessed, and the associated pointer is used to index into and get the appropriate bitmap entry or sharing pattern in the directory table, which represents the sharer bitmap for the cache line.

As shown in the FIG. 5 embodiment of the invention, the directory organization is decoupled from the cache 502. The size of the directory can be optimized based on various constraints including, but not limited to, any one or combination of energy, area, and latency. In an embodiment of the present invention, if space is not the main constraint, a large $N_{Dir}$: entries is chosen, all the way to the extreme case of using a unique entry for each cache line (emulating the baseline full map approach). On chip directory area is an important constraint. Applications demonstrate regular sharing patterns.

In order to implement the invention in a multi-core processor, a directory table that stores the recognized sharing patterns is required. In an embodiment of the invention, the sharing patterns in the directory table are organized in a set-associative manner with $N_{Dir}$:ways ways and $N_{Dir}$:sets sets to support a total of $N_{Dir}$:ways*$N_{Dir}$:sets sharing patterns. A pointer in each last level cache's ("LLC's") cache line tag identifies the entry containing the cache line's sharing pattern. In an embodiment of the present invention, the pointer is also used to index the directory table for a sharing pattern lookup. How entries in are inserted into the directory table, patterns dynamically collated when there are no free entries, entries removed from the directory table according to an embodiment of the present invention will now be described.

Inserting a New Pattern

When a cache line is accessed and a sharing pattern changes (or appears for the first time), the sharing pattern needs to be inserted in the directory table. Once a free entry is found in the directory table, the set and way are used by the cache line to access the specific entry. The key challenge is to determine where in the set associative directory table the new sharing pattern should be stored. In an embodiment of the present invention, the hash function that calculates the set index is unbiased so as to not increase pollution in any given set. In an embodiment of the present invention, similar patterns map to the same set so as to enable better collation of entries when the protocol runs out of free directory entries.

Figure 6:
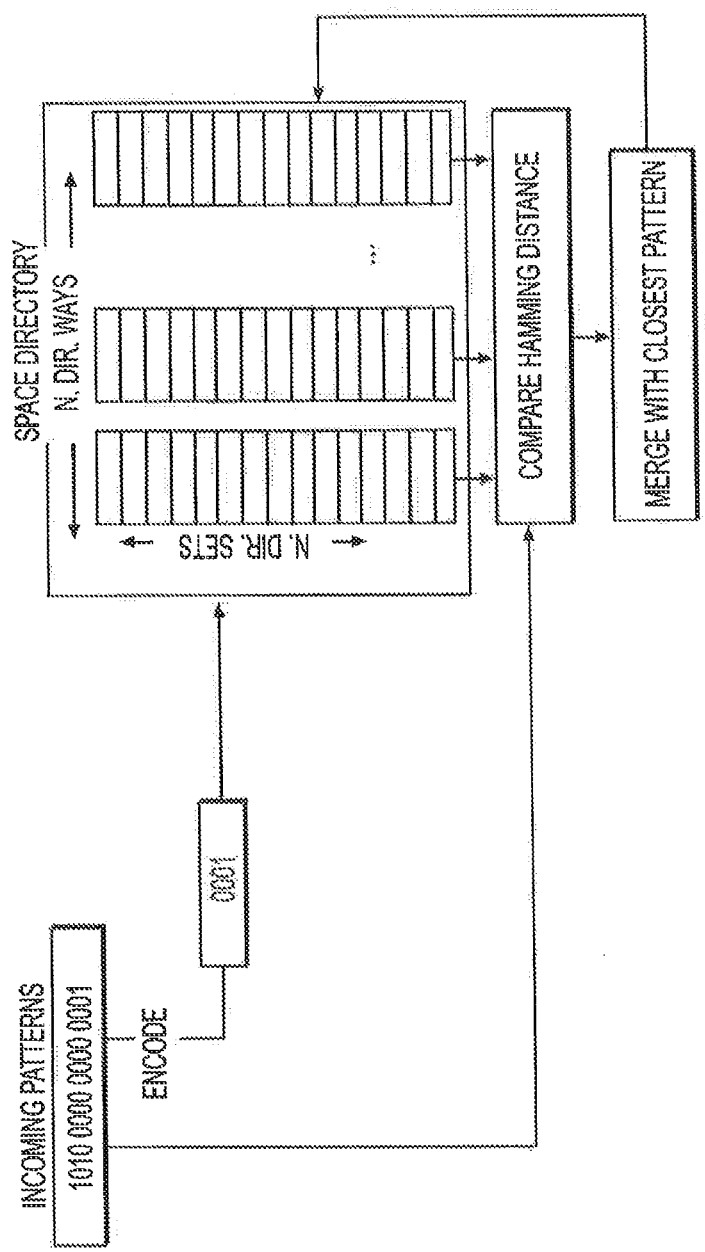
FIG. 6 depicts a system according to FIG. 5 for inserting a sharing pattern according to an embodiment of the present invention.

To satisfy these two seemingly contradictory goals a simple encoding scheme is used that includes encoding the full sharer bit-vector 602 into a compressed bit vector 604 of fewer bits as shown in FIG. 6, with each bit standing for sharers existing in the specific cluster. For instance, for a multicore with 16 cores in a 4×4 mesh and with $N_{Dir}$:sets=16, the 16-bit sharing vector will be compressed to a 4-bit vector, each bit corresponding to whether a sharer exists in one of the four 2×2 clusters. Then the compressed log 2($N_{Dir}$:Sets) bit vector will be used to index into the directory table 606. This process is illustrated in FIG. 6.

The main advantage of this hashing function is that it considers all the bits in the sharing vector and removes bias towards any specific subset of the processors. Since sharing pattern variations within a cluster map to the same set, it also enables us to perform effective collation of patterns when there are no free patterns available—extra coherence messages are limited to within the same cluster.

In an embodiment of the present invention, since private and globally-shared (e.g., all processors cache a copy) patterns appear to be common patterns across all the applications, explicit directory indices for these P+1 patterns (where P is the number of processors) are dedicated. Hence, for lines modified by a specific processor ("M" state), SPACE will represent the processor accurately, which also helps with the implementation of the coherence protocol. In an embodiment of the present invention, these entries do not need to be backed by physical storage, since their decoded patterns are fixed and known at design time.

Merging with Existing Pattern

In an embodiment of the present invention, a fixed size directory deals with the appearance of new patterns in the application when the directory is already completely filled. When the pattern is added to the directory, SPACE searches all the ways in the particular set-index for a matching pattern. If there exists a matching entry, SPACE will simply provide the cache line with a pointer to this entry.

In an embodiment of the present invention, when the incoming sharing pattern maps to a set with no free entries, it is merged with one of the existing patterns in the set. Cache lines already pointing to the entry can continue to use the sharing pattern specified although it is no longer precise. SPACE does try to ensure that such merging minimizes the pollution of the existing entry. In an embodiment of the present invention, this is achieved by determining the hamming distance of the incoming pattern to all the existing patterns in the set. This distance is the number of bit positions in which the incoming pattern differs from the existing pattern, and indicates the number of extra false sharers that would be caused by the merging. After determining this distance by an XOR function, the incoming pattern will merge with the existing pattern with least hamming distance (minimal false sharers) using the simple OR operation.

This novel technique of merging sharing patterns ensures that existing cache lines that point to the entry will suffer minimal performance penalty because of the extra sharer bits. This is one of the key contributions of the present invention. In an embodiment of the present invention, when the directory runs out of space, sharing patterns similar to each other will dynamically be collated.

Removal of a Stale Pattern

Finally, the last challenge that needs to be addressed is to ensure that entries in the directory are re-usable once no cache block has the sharing pattern in the entry. Recycling entries by removing stale patterns is vital for SPACE, because the system would otherwise fall back to broadcast with new patterns continually merging with stale patterns in the limited entries.

In an embodiment of the invention, a simple method of reference counting is used to detect when an entry becomes stale (i.e., a sharing pattern in the directory table is no longer in use). A reference counter 506 is associated with each entry in the directory table. A reference counter counts the actual number of data blocks that refer to a sharing pattern. This counter is incremented when a new cache line starts pointing to the entry and is decremented when a cache line pointing to the entry changes its pointer (e.g., either the cache line was evicted or it changed its sharing pattern). It is determined whether the reference counter is zero to detect when a sharing patter in the directory is no longer in use. An entry is reclaimed when the counter reaches zero. In an embodiment of the present invention, the counter includes $\log_2 M$ bits to deal with the worst case when all the M cached lines have the same pattern. The overhead of these counters itself is a small fraction of the overall area and—with a 512-entry SPACE directory and a 64 MB L2 cache, the counter bits only consumes 0.1% of the overall space consumption. Alternatively, if a smaller reference counter size is used, in case of saturation, additional cache lines could use additional ways in the set or default to broadcast.

Protocol Support According to an Embodiment of the Present Invention

In an embodiment of the present invention, an important optimization resolves the case when the directory provides an inaccurate list of sharers to the coherence protocols. This occurs, for example, when sharing patterns are conservatively merged due to lack of space. Such inaccuracies will at most cause false positives (indicate processors which are not actual sharers) but not false negatives (miss an actual sharer). In an embodiment of the present invention, the private access sharing patterns are kept locked down and the single sharer is ensured to be accurately provided to the coherence protocol. The coherence protocol's action in this case does not have to change. The only inaccuracy the coherence protocol needs to deal with is false-positive sharers for which invalidations will be forwarded. In an embodiment of the present invention, this can be handled with an acknowledgment of invalidation sent by a false sharer even if it does not have the cache block. False-positive sharer invalidation is incurred, for example, when the number of sharing patterns exceeds the directory capacity (or incurs conflicts).

Centralized or Tiled Directory Table

In tiled multicores, the present invention banks and distributes a fraction of the directory sharing pattern table to each tile or maintains a centralized table for the whole chip. Distribution works well in terms of latency without an increase in area overhead if the sharing patterns across tiles are disjoint. However, with a line-interleaved LLC (last level cache), overlap of sharing patterns is highly likely. A centralized table would thus save area, since to support Patterns sharing patterns, a centralized directory would require Patterns directory entries, while a tiled directory would in the worst case require Patterns per tile.

Interestingly, comparing the overheads of tiled versus centralized SPACE directories is dominated by the pointers in the cache line. For both the tiled case and the centralized case, to support $P_{atterns}$ requires $\log_2(P_{atterns})$ per cache line. In a 16-processor multicore, the area overhead of the centralized-SPACE is only 1% smaller than the tiled-SPACE with a 512-entry pattern directory table. The centralized-SPACE does impose significant latency since each cache bank has to communicate over the network to initiate a directory lookup. The overheads of this directory access penalty appeared to have a significant impact on performance.

Area Overheads

The area overhead for SPACE includes two main components (1) the pointers to the directory entry associated with each cache line and (2) the sharing bit-vectors in the directory itself. Consider a system that has M cache lines and P cores. Let Patterns be the number of sharing patterns in the application. A conventional full map directory associates a P bit pointer with each cache line and consumes M*P bits. With SPACE, the pointers associated with each cache line requires d $\log_2$Npatterns and for M cache lines consumes M*log 2 $P_{atterns}$ bits. The directory table itself is a Patterns*P bit array. Overall, to achieve better space efficiency than the conventional directory, the following condition has to be satisfied: $M*P > M*\log_2 P_{atterns} + P_{atterns}*P$. The directory can only have as many patterns as the number of cached blocks and this value is also bounded by the number of patterns possible with a P-bit vector. Hence, the maximum value for $P_{atterns}$ is MIN (2P,M).

Figure 7A:
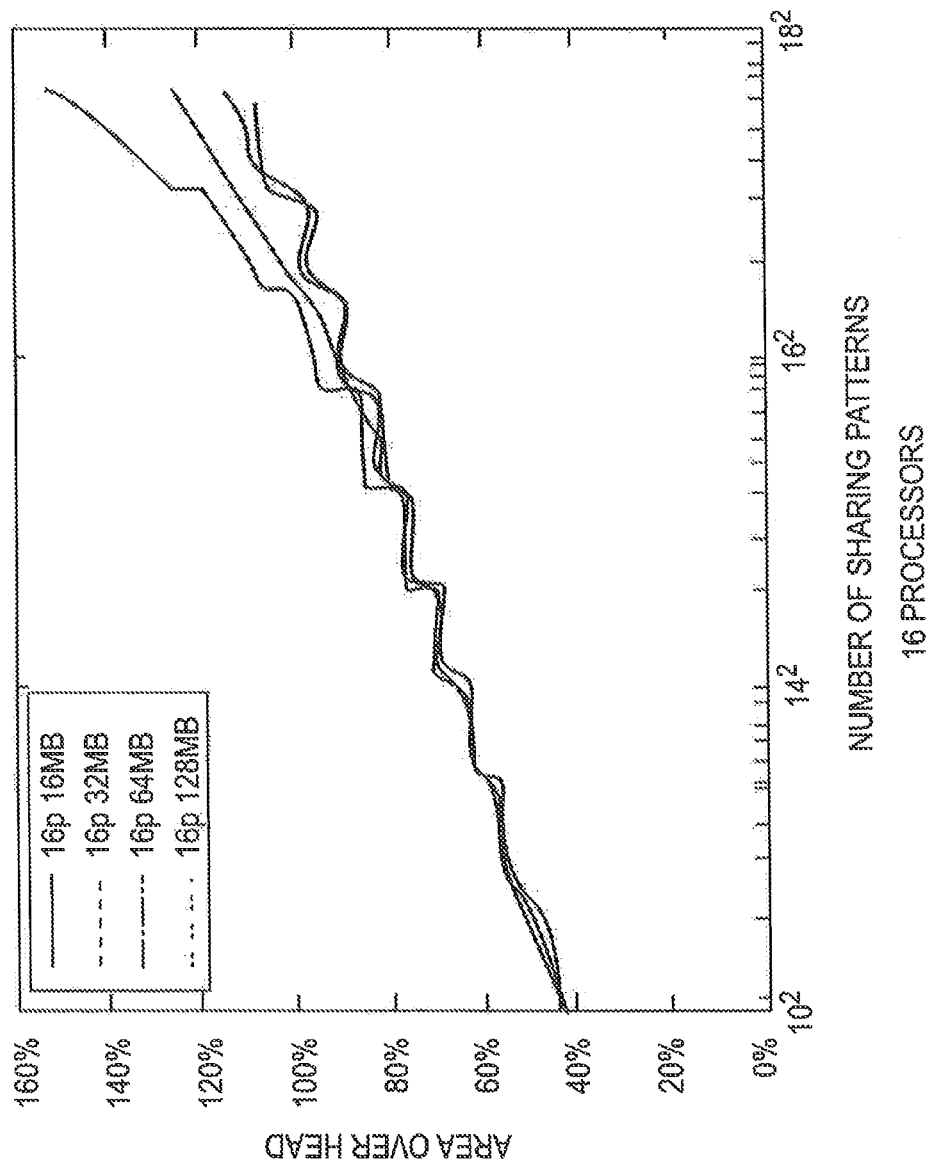
FIG. 7A shows an area overhead according to an embodiment of the present invention compared to a prior art full map directory for 16 processors.
Figure 7B:
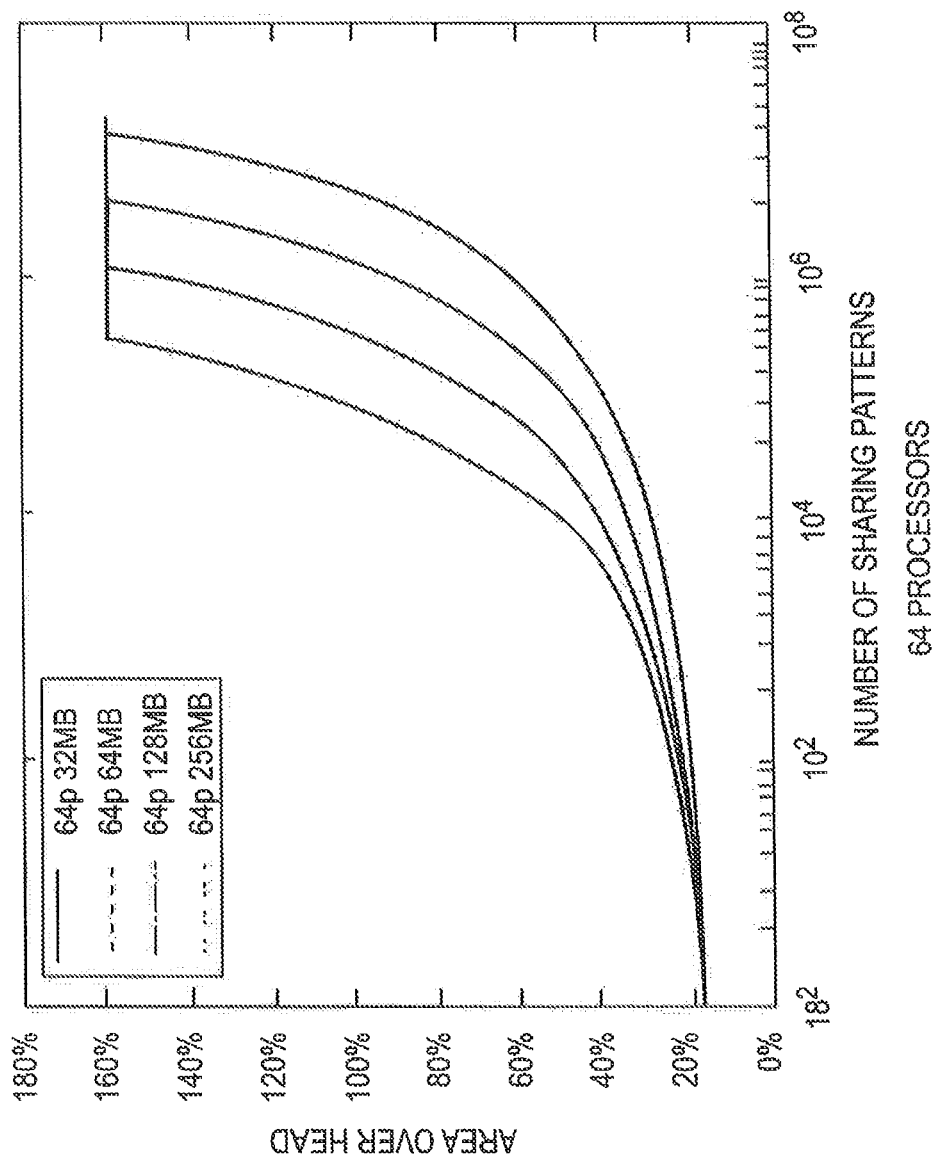
FIG. 7B shows an area overhead according to an embodiment of the present invention compared to a prior art full map directory for 64 processors.

In the FIG. 5 embodiment of the invention, there is an additional $\log_2 M$ reference count bits per table entry. In the FIGS. 7(a) and 7(b) embodiments of the invention, the overhead is illustrated. FIGS. 7(a) and 7(b) show the present invention's storage requirements compared to the traditional full bit vector directory design with varying L2 sizes for two different processor configurations. In the case of 16 cores and a 64 MB L2 cache (see FIG. 7(a)), the present invention has less storage overhead comparing to the full map directory if the invention supports less than 42000 patterns. The maximum possible patterns in this configuration is limited by the number of processors to 65536 (Min (65536,1024*1024))– SPACE needs one 16-bit vector per cache line for the pointer to represent all the patterns. Even in this worst case, the extra overhead SPACE is paying is simply the size of the directory table, which is a small fraction of the overall L2, 0.2% of a 128 MB L2 and 0.4% of a 64 MB L2. In the 64 processor multicore, the maximum number of patterns that would need to be supported is limited by the number of cache lines, M (MIN (264,M)). As long as the maximum number of patterns required by an application is less than 2:5*105, the present invention will have a smaller area overhead than the conventional directory.

Most applications require the directory to maintain a small number of patterns varying between 75-1700. Interestingly, in this range, for multicourse in the near future (64-256 cores), the number of cache lines in the shared M>>Patterns and empirically, Patterns<<2P. Overall, in SPACE, the overhead of the pointers associated with each L2 cache line is the dominant overhead since $M*\log_2$ Patterns>>Patterns*(P+$\log_2 M$). To study the properties of such a system, we study the overheads of SPACE varying the number of cores while keeping the cache size I core constant.

Figure 7C:
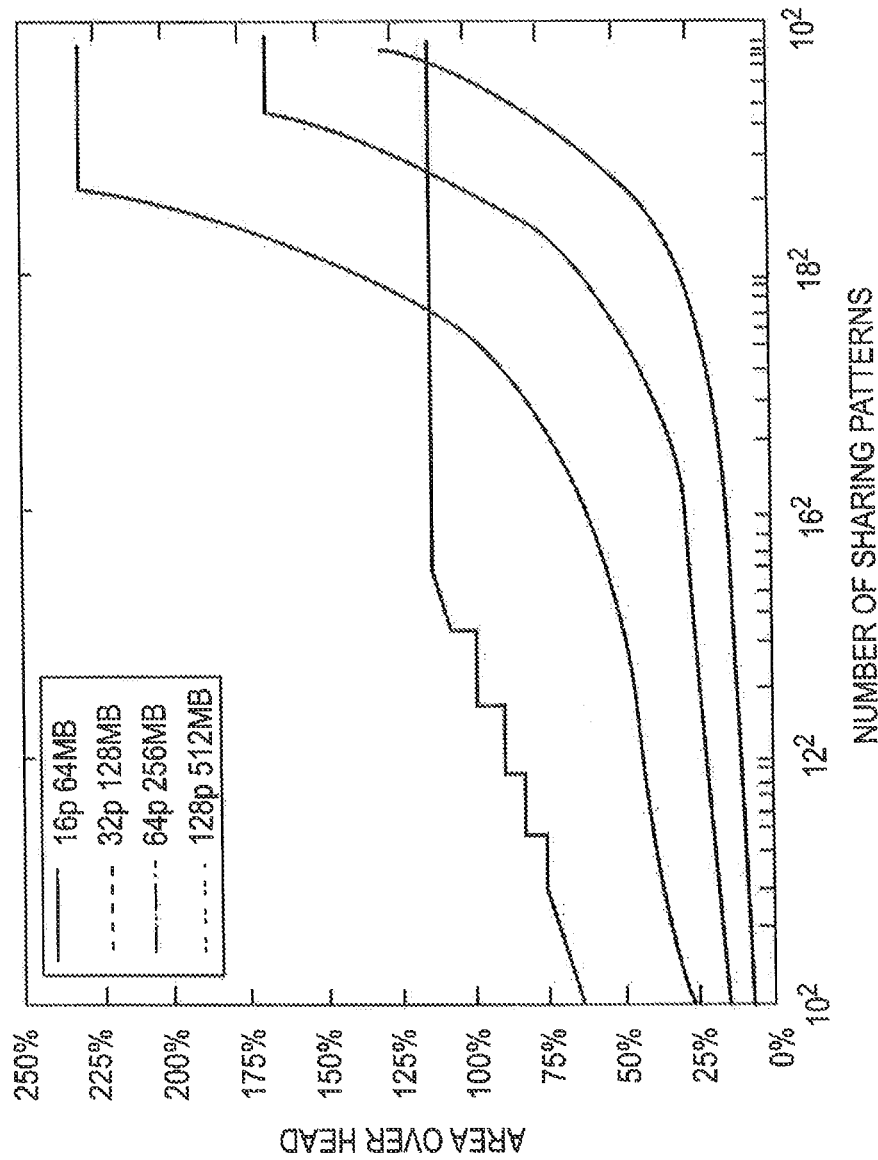
FIG. 7C shows an area overhead according to an embodiment of the present invention compared to a prior art full map directory for a 4 MB L2 Cache.

FIG. 7(c) demonstrates at 1000 entries (X axis start), SPACE requires approximately 60% of the area when compared to a full map directory for 16 cores, and approximately 20% for 64 cores. FIG. 7(c) also shows that at a large number of entries (not required by our applications) the directory table itself becomes a large fraction of the overall area overhead. The curves are all terminated when they reach the maximum possible number of sharing patterns possible in the system, which is MIN (2P,M).

Note that the size of the sharing vector will also grow linearly with respect to the number of processors in the system (P). As a result, in the conventional full map directory the percentage of the whole cache used as the directory will grow linearly, and does not scale well with the number of cores. In an embodiment of the present invention, with the per cache line pointer being the dominant overhead, the size of the pointer will grow sub-linearly with respect to P since $\log_2 N$patterns bits are needed per cache line, and Patterns grows linearly with P according to our empirical data. SPACE is therefore a more scalable approach to directory design for multicore platforms.

SPACE

The present invention focuses on frequently needed sharing patterns and exploits the overall sharing trends in the application to minimize space while directory caches track commonly accessed cache lines. Compared to prior art directory caches in which each entry represents the pattern of a unique cache block, the present invention's pattern directory improves the utilization of every entry. Each entry represents the information for multiple cache blocks (possibly all the cache blocks) in the shared cache. The present invention achieves this by eliminating the address tags and using pointers in the shared cache to explicitly map a location to a given pattern entry. This permits effective use of each pattern entry since the entry is no longer associated with one specific cache block. Furthermore, when the pattern table has no free space, the present invention dynamically collates the blocks' sharing pattern with a similar pattern leading to a conservative expression that gradually increases the possibility of false positive sharers without defaulting to the extreme measures (evicting or broadcasting) of the directory cache. SPACE has area overhead similar to the coarse vector approach, while keeping the network utilization comparable to the full map approach.

Figure 8:
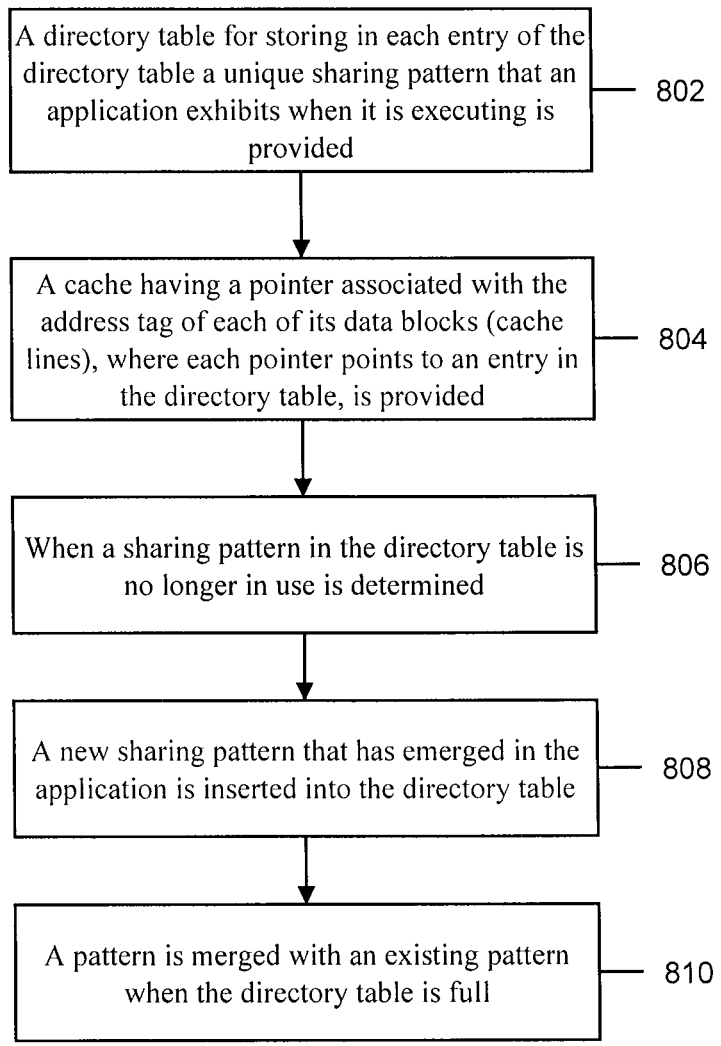
FIG. 8 depicts a method of decoupling the metadata representing sharing patterns from the address tags representing the data blocks, in a cache coherent shared memory computer, according to an embodiment of the present invention.

FIG. 8 depicts a method of decoupling the metadata representing sharing patterns from the address tags representing the data blocks, in a cache coherent shared memory computer, according to an embodiment of the present invention. In step 802, a directory table for storing in each entry of the directory table a unique sharing pattern that an application exhibits when it is executing is provided. In step 804, a cache having a pointer associated with the address tag of each of its data blocks (cache lines), where each pointer points to an entry in the directory table, is provided. In step 806, when a sharing pattern in the directory table is no longer in use is determined. This step further includes providing a reference counter associated with every entry in the directory table that counts the actual number of data blocks that refer to the sharing pattern and determining that the entry is no longer in use when the reference counter is zero.

In step 808, a new sharing pattern that has emerged in the application is inserted into the directory table. This step further includes decrementing the reference count of the sharing pattern to which the block currently points, using a hashing function to identify any entries in the directory table with the same sharing pattern, modifying an available entry that is no longer in use to contain the new sharing pattern if none exists, changing the pointer associated with the data block to point to the entry containing the new sharing pattern, and incrementing the reference count of the sharing pattern entry pointed to. In step 810, a pattern is merged with an existing pattern when the directory table is full. The step further includes using the hashing function to find existing patterns to compare against the new sharing pattern, using a cost function to compare the new pattern with existing patterns and determine the cost of introducing false sharers, and determining which entry in the sharing pattern table to merge with the incoming pattern based on the cost function.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What we claim is:

1. A method for comparing and merging a new sharing pattern with existing patterns when a directory is filled comprising:
   providing a cache coherent shared memory computer, a memory comprising a plurality of data blocks, a sharing pattern table comprising a plurality of bit vectors, each bit vector representing a unique processor sharing pattern of a set of processors of said plurality of processors that shares at least one or more common data blocks of said memory during an execution of an application, a cache having a plurality of cache lines, each cache line comprising an address tag associated with a data block, and a bit pointer to index said cache line into said sharing pattern table to retrieve a corresponding bit vector of a unique processor sharing pattern corresponding to said cache line and to thereby decouple said unique processor sharing patterns from said cache lines, and wherein said cache lines having a same processor sharing pattern point to a common bit vector in said sharing pattern table;
   searching existing patterns to compare against the new sharing pattern for a matching pattern by use of a hashing function;
   providing a specific cache line with a pointer to an entry where there is a matching sharing pattern, or where there is no matching sharing pattern found: entering the new sharing pattern into an unused table entry, or where there is no unused entry found:
comparing the new pattern with existing patterns to determine a cost of introducing false sharers by use of a cost function; and
determining which entry in a sharing pattern table to merge with the new pattern based on the cost function.

2. A system for decoupling metadata representing processor sharing patterns from address tags representing data blocks of memory, in a cache coherent shared memory computer comprising:
a plurality of processors;
a memory comprising a plurality of data blocks;
a sharing pattern table comprising a plurality of bit vectors, each bit vector representing a unique processor sharing pattern of a set of processors of said plurality of processors that shares at least one or more common data blocks of said memory during an execution of an application;
a cache having a plurality of cache lines, each cache line comprising an address tag associated with a data block, and a bit pointer to index said cache line into said sharing pattern table to retrieve a corresponding bit vector of a unique processor sharing pattern corresponding to said cache line and to thereby decouple said unique processor sharing patterns from said cache lines; and
wherein said cache lines having a same processor sharing pattern point to a common bit vector in said sharing pattern table.

3. The system for decoupling metadata representing sharing patterns from address tags representing data blocks of claim 2, wherein merger of an incoming new sharing pattern comprises a determination of a hamming distance between said new sharing pattern and existing patterns, and said new sharing pattern merges with an existing pattern with a least hamming distance.

4. A method of decoupling metadata representing sharing patterns from address tags representing data blocks, in a cache coherent shared memory computer comprising:
providing a plurality of processors, a memory comprising a plurality of data blocks, a sharing pattern table comprising a plurality of bit vectors, each bit vector representing a unique processor sharing pattern of a set of processors of said plurality of processors that shares at least one or more common data blocks of said memory during an execution of an application, a cache having a plurality of cache lines, each cache line comprising an address tag associated with a data block, and a bit pointer to index said cache line into said sharing pattern table to retrieve a corresponding bit vector of a unique processor sharing pattern corresponding to said cache line and to thereby decouple said unique processor sharing patterns from said cache lines, and wherein said cache lines having a same processor sharing pattern point to a common bit vector in said sharing pattern table;
storing in each entry of said sharing pattern table said unique processor sharing pattern that an application exhibits when it is executing; and
pointing a plurality of cache lines having a same sharing pattern point to a common entry in said sharing pattern table.

5. The method of claim 4, further comprising determining when a sharing pattern in the sharing pattern table is no longer in use in a pattern table.

6. The method of claim 5, wherein determining when said sharing pattern in the sharing pattern table is no longer in use in the pattern table comprises:
providing a reference counter associated with every entry in the sharing pattern table that counts an actual number of data blocks that refer to the sharing pattern by incrementing said reference counter when a data block points to said sharing pattern and decrementing said reference counter when said data block no longer points to said sharing pattern; and
determining that the entry is no longer in use when the reference counter is zero.

7. The method of claim 4, further comprising inserting a new sharing pattern that has emerged in the application into the sharing pattern table.

8. The method of claim 7, wherein inserting said new sharing pattern that has emerged in the application into the sharing pattern table comprises:
decrementing a reference count of the sharing pattern to which a block currently points;
using a hashing function to identify any entries in a pattern table with a same sharing pattern;
modifying an available entry that is no longer in use to contain the sharing pattern if none exists;
changing a pointer associated with said data block to point to the entry containing the sharing pattern; and
incrementing said reference count of a sharing pattern entry pointed to.

9. The method of claim 4, further comprising comparing and merging with existing patterns when all entries identified using a hashing function are in use.

10. The method of claim 9, wherein comparing and merging with existing patterns comprises:
using a hashing function to find existing patterns to compare against a new sharing pattern;
using a cost function to compare the new sharing pattern with existing patterns and determine a cost of introducing false sharers; and
determining which entry in a sharing pattern table to merge with an incoming pattern based on the cost function.

11. The method of decoupling metadata representing sharing patterns from address tags representing data blocks of claim 4, further comprising the step of:
merging of an incoming new sharing pattern by determining a hamming distance between said incoming new sharing pattern and existing patterns, and merging said new sharing pattern with an existing pattern with a least hamming distance.

* * * * *